US012447665B2

(12) United States Patent
Schmidt et al.

(10) Patent No.: US 12,447,665 B2
(45) Date of Patent: Oct. 21, 2025

(54) BLOWING VALVE DEVICE OF A BLOW-MOULDING DEVICE

(71) Applicant: Eugen Seitz AG, Wetzikon (CH)

(72) Inventors: Joachim Schmidt, Hettlingen (CH); Mathias Fehlmann, Pfäffikon (CH)

(73) Assignee: Eugen Seitz AG, Wetzikon (CH)

( * ) Notice: Subject to any disclaimer, the term of this patent is extended or adjusted under 35 U.S.C. 154(b) by 204 days.

(21) Appl. No.: 17/441,348

(22) PCT Filed: Mar. 13, 2020

(86) PCT No.: PCT/EP2020/056941
§ 371 (c)(1),
(2) Date: Sep. 21, 2021

(87) PCT Pub. No.: WO2020/193236
PCT Pub. Date: Oct. 1, 2020

(65) Prior Publication Data
US 2022/0152911 A1 May 19, 2022

(30) Foreign Application Priority Data

Mar. 22, 2019 (EP) .................................. 19164639
Apr. 17, 2019 (EP) .................................. 19169887

(51) Int. Cl.
*B29C 49/78* (2006.01)
*B29C 49/42* (2006.01)
(Continued)

(52) U.S. Cl.
CPC .......... *B29C 49/78* (2013.01); *B29C 49/4289* (2013.01); *B29C 49/783* (2013.01);
(Continued)

(58) Field of Classification Search
CPC ... B29C 49/783; B29C 49/4289; B29C 49/78; B29K 2023/12; B29K 2067/003; B29L 2031/7158
See application file for complete search history.

(56) References Cited

U.S. PATENT DOCUMENTS 7,674,108 B2    3/2010  Lemaistre
9,221,208 B2   12/2015  Schmidt
(Continued)

FOREIGN PATENT DOCUMENTS

CN      102485469 A       6/2012
DE   102017109112 A1      10/2018
(Continued)

*Primary Examiner* — Alison L Hindenlang
*Assistant Examiner* — Shibin Liang
(74) *Attorney, Agent, or Firm* — The Webb Law Firm

(57) ABSTRACT

In a method for monitoring a blow-moulding device for producing a hollow body, the blow-moulding device includes at least one process valve unit for feeding a process fluid into a preform of the hollow body under process pressure, wherein the process valve unit includes at least one electrically operated valve. During a blow-moulding process, at least one value of an electric current of the electrically operated valve is detected. The method and the device allow early recognition of an ageing process of the process valves, in particular their pilot valves, and/or the recognition of the status of valve properties.

32 Claims, 13 Drawing Sheets

(51) Int. Cl.
 *B29K 23/00* (2006.01)
 *B29K 67/00* (2006.01)
 *B29L 31/00* (2006.01)

(52) U.S. Cl.
 CPC .... *B29K 2023/12* (2013.01); *B29K 2067/003* (2013.01); *B29L 2031/7158* (2013.01)

(56) References Cited

U.S. PATENT DOCUMENTS

| | | |
|---|---|---|
| 9,676,136 B2 | 6/2017 | Deau |
| 2008/0069914 A1 | 3/2008 | Lemaistre |
| 2012/0139169 A1 | 6/2012 | Finger |
| 2013/0187304 A1* | 7/2013 | Deau .................. B29C 49/12 |
| | | 425/149 |
| 2014/0298100 A1 | 10/2014 | Grimm |
| 2015/0097306 A1 | 4/2015 | Finger et al. |
| 2015/0184771 A1* | 7/2015 | Chen ................ B29C 49/4289 |
| | | 251/30.01 |
| 2015/0321412 A1 | 11/2015 | Deau |
| 2016/0114519 A1 | 4/2016 | Dachs |
| 2016/0158994 A1 | 6/2016 | Schmidt et al. |
| 2016/0332357 A1* | 11/2016 | Gendre .................. B29C 49/58 |

FOREIGN PATENT DOCUMENTS

| | | |
|---|---|---|
| EP | 1306195 A2 | 5/2003 |
| EP | 2098356 A2 | 9/2009 |
| EP | 2837486 A1 | 2/2015 |
| WO | 2006008380 A1 | 1/2006 |
| WO | 2015010216 A1 | 1/2015 |

* cited by examiner

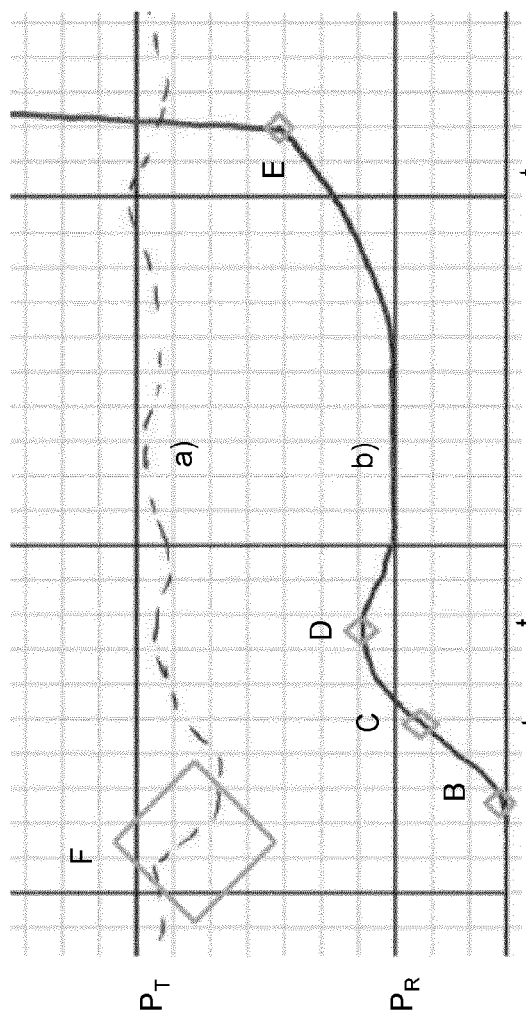
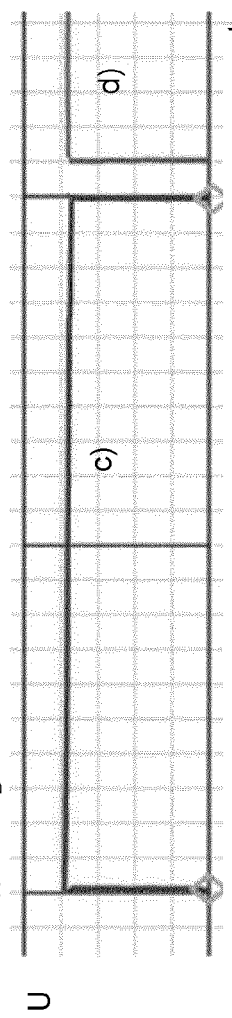
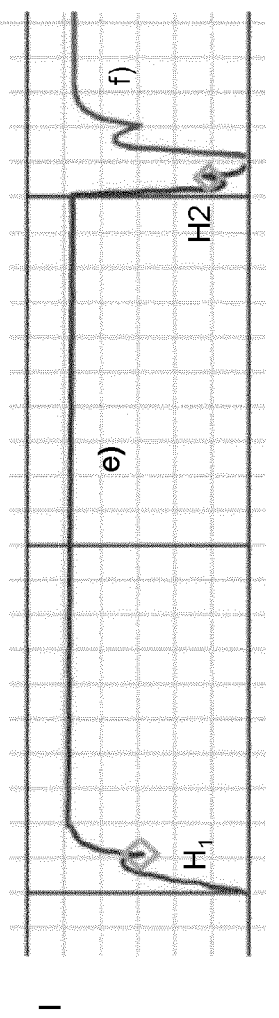
FIG. 5a
FIG. 5b
FIG. 5c

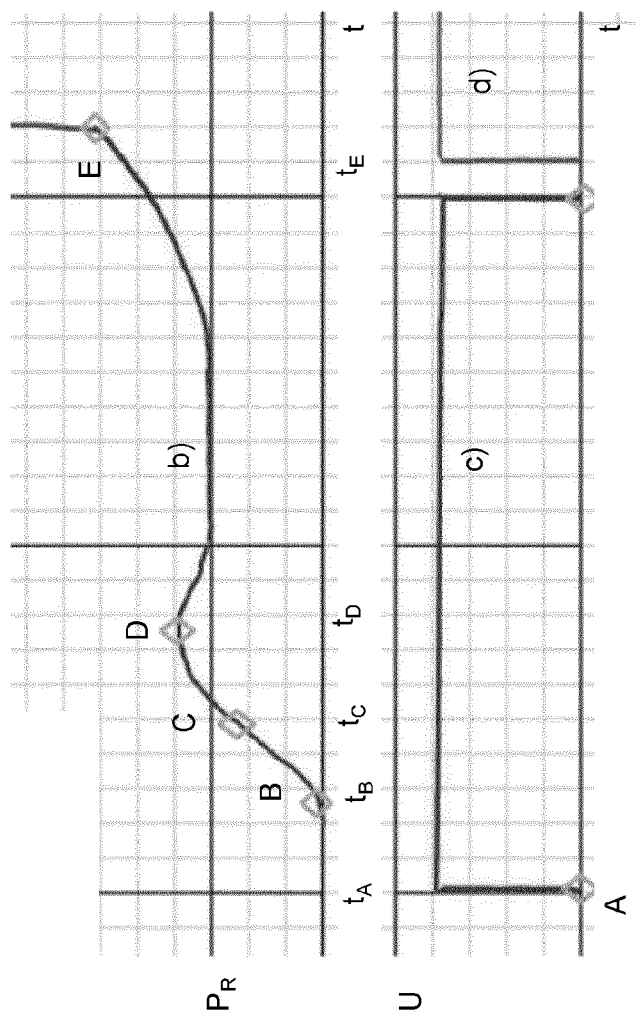

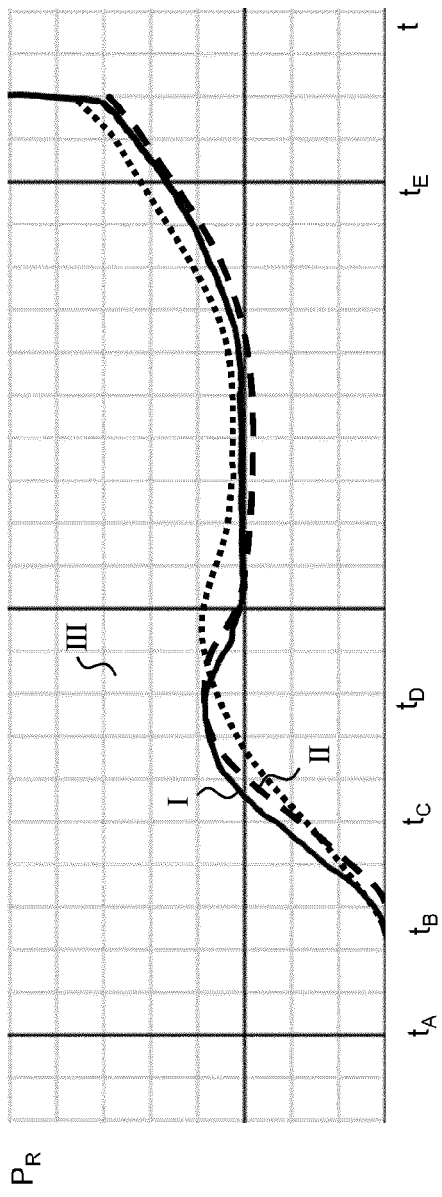
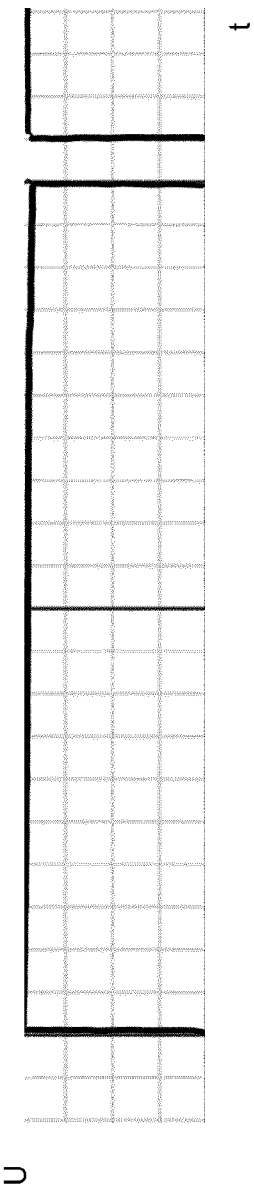
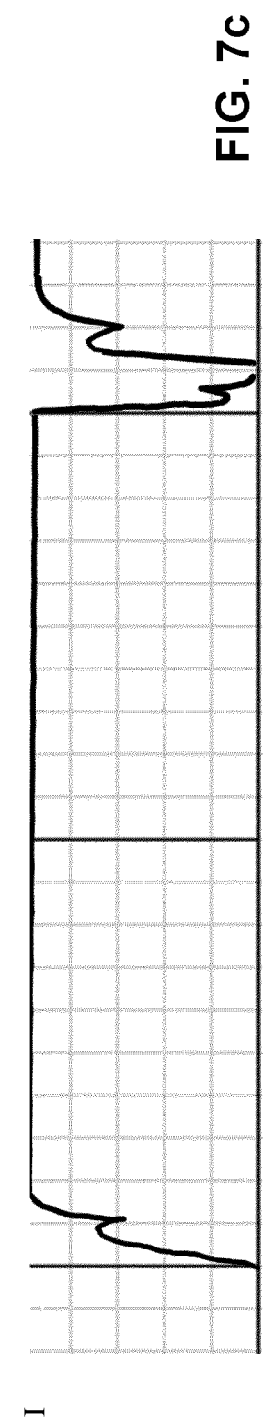
FIG. 7a
FIG. 7b
FIG. 7c

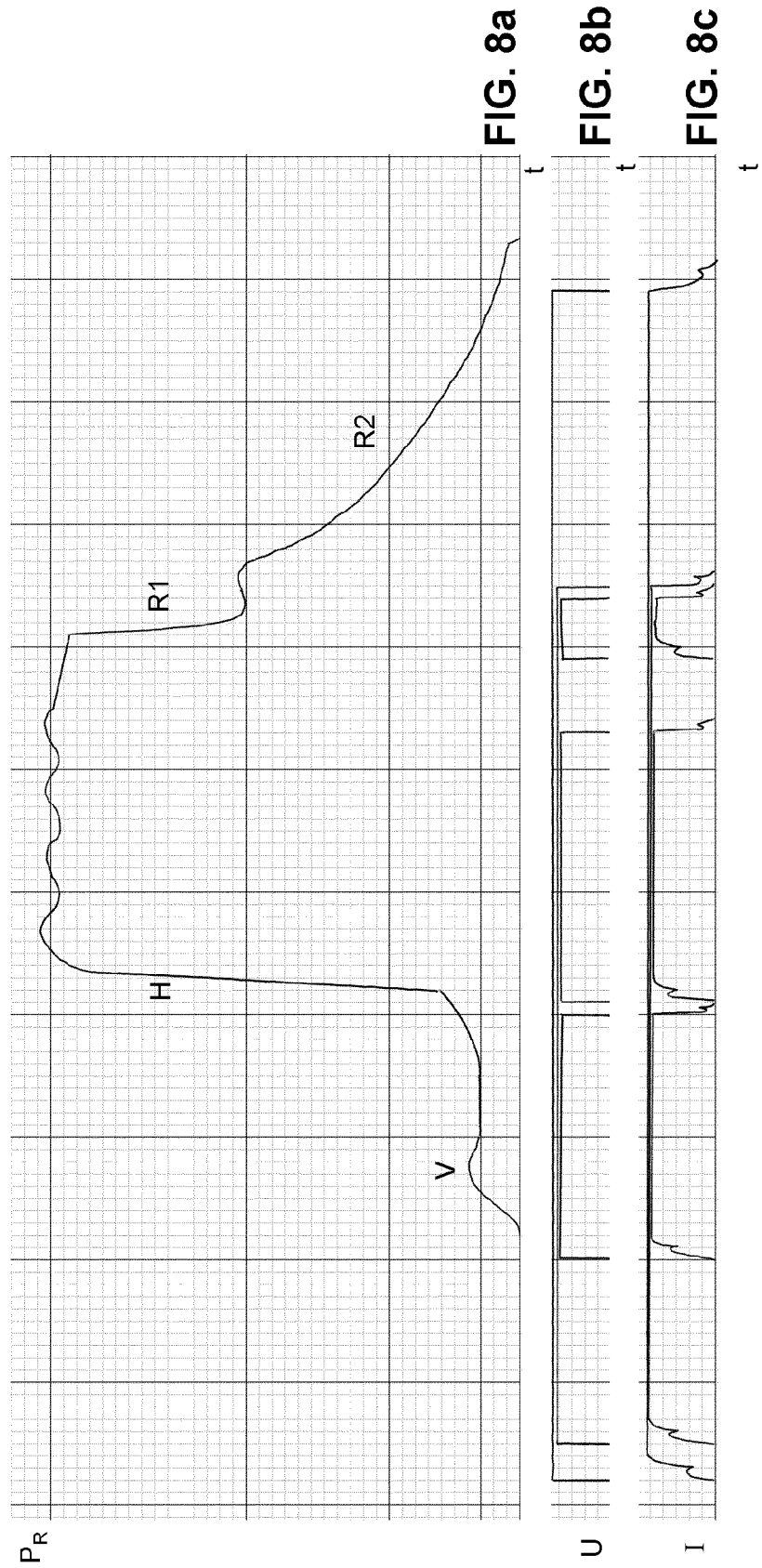

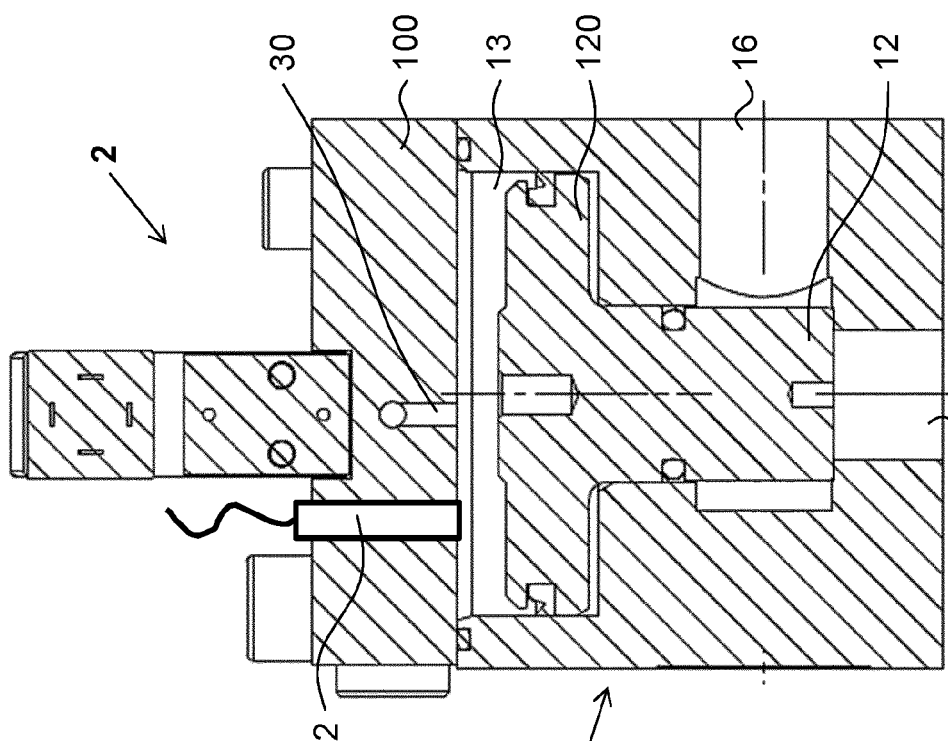
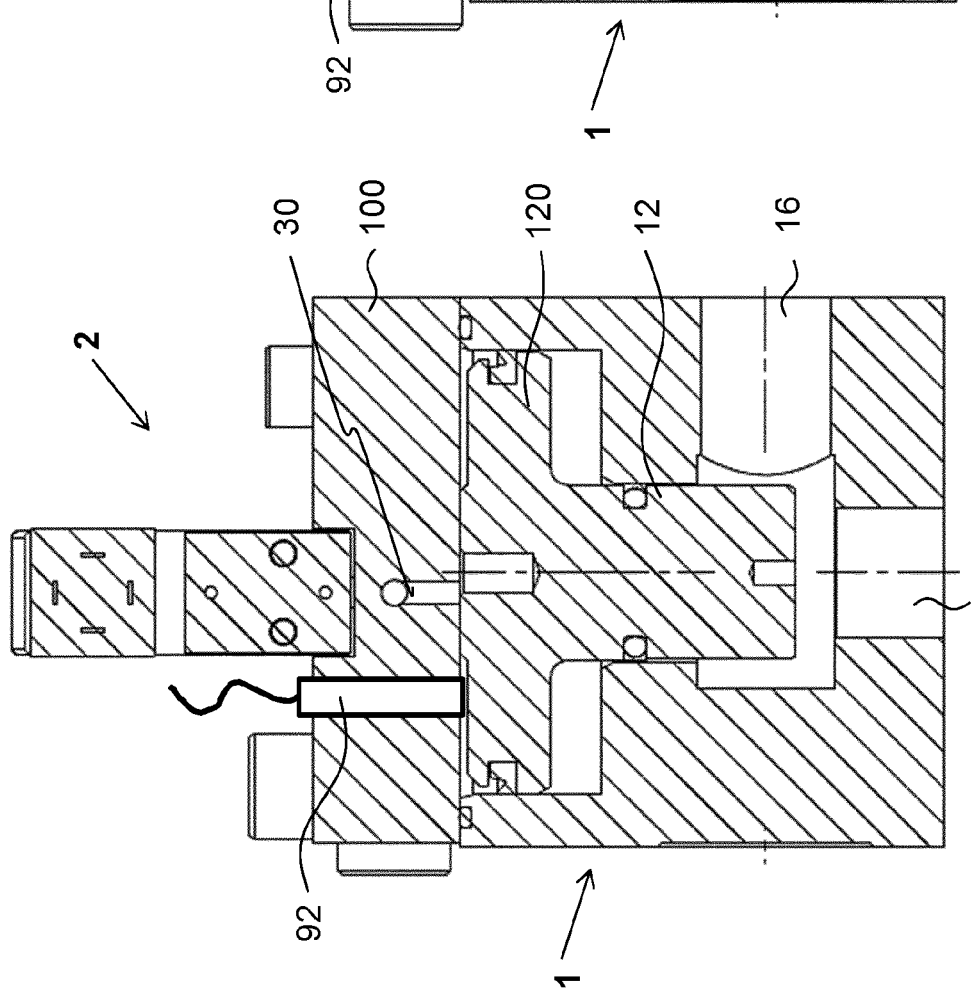
FIG. 13a
FIG. 13b

BLOWING VALVE DEVICE OF A BLOW-MOULDING DEVICE

CROSS-REFERENCE TO RELATED APPLICATIONS

This application is the United States national phase of International Application No. PCT/EP2020/056941 filed Mar. 13, 2020, and claims priority to European Patent Application Nos. 19164639.7 filed Mar. 22, 2019 and 19169887.7 filed Apr. 17, 2019, the disclosures of which are hereby incorporated by reference in their entirety.

BACKGROUND OF THE INVENTION

Field of the Invention

The present invention relates to a method, a blowing valve assembly and a computer program product for monitoring a blow-moulding device for producing a hollow body.

A further invention relates to a method, a control system and a computer program product for monitoring a blow-moulding unit for producing a hollow body.

Description of Related Art

Hollow bodies made from thermoplastics, in particular PP or PET bottles (PP=polypropylene; PET=polyethylene terephthalate), are usually produced by means of blow-moulding machines. For this purpose, a blank or preform is fed to the blow-moulding machine. The blank essentially already has the finished bottle head, by means of which the blank is held in a blow mould of the blow-moulding machine. By injecting a process gas, usually air, through the bottle head, the heated blank is inflated until it has reached its final shape. This shape is defined by a surrounding moulding die.

Injection preferably takes place in two or more stages. In the case of preblowing at a first pressure of usually 2 to 20 bar, the blank first becomes longer until it also expands radially and, during the subsequent main blowing process at a higher second pressure of usually 15 to 40 bar, the hollow body receives its desired final shape. Depending on the method, only blowing is carried out or the blank is also stretched during the preblowing by means of a sliding mandrel, also called a stretching rod. This second method is called stretch blow-moulding.

The present blow-moulding machines and stretch blow-moulding machines usually have a device for partially reclaiming the process gas, i.e. recovery takes place. The remaining process gas is then passed to the outside, and the hollow body is thus vented.

The preblowing, the main blowing and, where applicable, the recovery and the venting are controlled by means of respective valves, here referred to as process valves.

The production of such hollow bodies by means of blow-moulding machines takes place within a few seconds, usually within 1-3 s. The process valves must therefore have correspondingly short response times.

Pilot-controlled blowing valve assemblies, also referred to here as process valves, which have a pneumatically actuated main valve and at least one associated pilot valve, have proven successful. Depending on the embodiment, at least one booster stage is additionally present. In the main valve, use is made of the compressed air which is also used as a working medium for shaping the hollow body, the main valve being pneumatically pilot-controlled by means of the at least one pilot valve.

The control gas, likewise usually air, is fed to a control chamber of the main valve by means of the at least one pilot valve. Depending on the embodiment, there is one pilot valve per main valve, or there are two pilot valves per main valve. Solenoid valves, i.e. magnetic valves with a spindle, also called a plunger, are usually used as pilot valves.

Such a process valve with a pilot valve and a pneumatic main valve is described in WO 2015/010216. The individual process valves are normally combined in a common valve block, as described, for example, in EP 2 837 486 B1.

In other embodiments, a directly controlled process valve is used instead of the pneumatically pilot-controlled valve described above. The electromagnet directly applies the force required to move the process valve.

In order to ensure a uniform quality of the final hollow bodies, it is necessary that no deviations should occur in the course of the process. Even the smallest deviations in the pressure of the process gas or in the blowing times can lead to an undesirably large amount of unsatisfactory reject end products.

However, the process valves are exposed to high loads and must ensure a high number of switching cycles within a very short time. At the same time, they must work extremely precisely and have the shortest possible response times. However, the valves are subject to an ageing process. As a precaution, they are therefore replaced after a predetermined maximum period of use and/or a predetermined maximum number of switching cycles. During this process, the blow-moulding machine must be shut down. The loss of production and above all the replacement of the valves per se increase production costs.

The ageing process of the individual process valves, in particular that of the preblowing valve, of the main blowing valve, of the recovery valve and of the vent valve, takes place in various areas. For example, the high-pressure seals and the plastic of the piston are subject to wear. In addition, the plunger of the solenoid valve tends to fail spontaneously. If this plunger fails, the main valve can no longer be actuated. The predominant cause of failure in the case of the pilot valves is an increase in friction on the plunger, as a result of which the latter moves in a delayed manner and thus activates the main valve in a delayed manner. This increase in friction is usually caused by abrasion or contamination.

US 2016/0332357 A1 discloses a method for detecting an ageing process or some other malfunction of the valves. This method is based on pressure measurement in the interior of the hollow body. The time of the command to open the valve is recorded, and the time of the pressure rise in the interior of the blank is detected by means of a pressure measurement or by means of some other detection means. From this, a time delay when opening the valve is calculated, and this value is compared with a value supplied by the manufacturer of the valve. In US 2016/0332357 A1, reference is made to solenoid valves and it is pointed out that these are disclosed in WO 2006/008380. The English-language counterpart to this is US 2008/0069914 A1. There, pneumatic piston valves are shown, which are controlled by means of control units that are not described in detail. These piston valves are wrongly called solenoid valves in said publication.

Furthermore, a successful blowing process depends on many factors. Examples of these are: the pressures used cannot be selected to be optimal for a specific blowing process, the pressure can change during the day, temperatures can fluctuate, the blank is not held optimally or the ejection of the blow-moulded body produced does not take place correctly. However, the process valves are a significant factor. These are exposed to high loads and must ensure a large number of switching cycles within a very short time. At the same time, they must work extremely precisely and have the shortest possible response times. However, ageing processes and other factors impair the functioning of the process valves. Process valves may open with a delay, too fast, too slowly or not at all despite the control command being sent at the correct time. Even if the process valves operate correctly, other sources of error can be compensated for by correcting the actuation of the process valves. For example, the time for sending the control command to the process valve or the duration of the open state of the valve can be altered if the tank pressure is not in a predetermined range.

U.S. Pat. No. 9,676,136 B2 discloses a control system for a blow-moulding unit having a plurality of blow-moulding stations. The system includes a master control unit and a plurality of slave control units.

Each slave control unit controls one or more blow-moulding stations. The pressure in the blow mould is measured during the blowing process and recorded as a curve. The slave control unit sends a value belonging to a specific point in the curve to the master control unit. The master control unit takes into account the values reported by all the slave control units for this specific point and calculates a specific value therefrom. If this specific value deviates from a theoretical specification, a correspondingly adapted control command is sent to each slave control unit and the slave control units carry out the further blowing processes on the basis of this new corrected control command.

This method is relatively complex and requires corresponding computing power. In addition, it is virtually impossible to detect individual faults in a single blow-moulding station.

SUMMARY OF THE INVENTION

It is therefore an object of the invention to detect malfunctions and ageing processes of process valves in blow-moulding machines as early as possible.

In the method according to the invention for monitoring a blow-moulding device for producing a hollow body, the blow-moulding device has at least one process valve unit for feeding a process fluid into a preform of the hollow body under process pressure, and the process valve unit has at least one electrically operated, in particular electromagnetically operated, valve. According to the invention, during a blowing process, at least one value of an electric current of the electrically operated valve is detected. Preferably, a characteristic of the electric current is detected during the blowing process.

The monitoring of the current of the electrically operated valve not only allows the detection of actual malfunctioning but also makes possible early detection and observation of an ageing process of the valve. In particular, the behavior of the plunger can be observed and a possible failure of this important component is detected at an early stage. In particular, electromagnetically actuated pilot valves, which are used for pilot control of pneumatic main valves, can be reliably monitored in this way. Other types of valve assembly with solenoid valves can also be monitored in this way.

By virtue of the method according to the invention, it is possible to recognize in good time when a valve must be replaced, e.g. based on empirical values in the behavior of previously used valves of the same type. Valves no longer need to be replaced according to predefined theoretical time periods or when a theoretically defined number of switching cycles is reached. They can be replaced if there is in fact a risk that they will no longer be able to perform their function satisfactorily in the near future. In principle, this makes it possible to extend the service life of such valves and thus save on costs. In addition, however, it is also ensured that valves which will fail even before the statistically or theoretically defined maximum service life can be identified at an early stage and can therefore likewise be replaced in a timely manner. In this way, unexpected incidents on the blow-moulding machine and unplanned production interruptions can be avoided.

The current of the valve is preferably measured in successive time intervals. These time intervals are preferably very short, preferably high-frequency. They are, for example, from 0.1 ms to 1 ms. The current is preferably measured 1,000 to 10,000 times per second. As a result, a relatively accurate current curve can be mapped.

In a variant of the method, a change in the current is measured and not the absolute value of the current. In a preferred variant of the method, the effective current value is measured. In this way, a characteristic curve is preferably obtained with rises and falls. The derivation is preferably used in an evaluation, for example in order to identify the local turning point which represents the end of counterinduction and thus the end of the plunger movement.

The time of measurement of the current is preferably recorded together with a current value measured at this time. These values can be entered, for example, in an electronic table which is used for later evaluation and/or for storing the values.

In a preferred form of the method, distinctive points of a characteristic of the electric current are detected. These distinctive points serve to enable the behavior of the valve to be tracked as accurately as possible.

In a variant of the method, the current is measured at predetermined times. If distinctive points in the current profile are to be found, the approximate times of these distinctive points can be determined by means of interpolation of the measured current values, for example.

The method according to the invention is suitable, in particular, for use with a process valve unit which has a main valve and at least one pilot valve, wherein the at least one pilot valve controls the main valve, and wherein the characteristic of the electric current of at least one of the at least one pilot valve is detected. Preferably, all the pilot valves are monitored by means of this current measurement.

The main valve is preferably a pneumatic valve which is operated by means of the process fluid and which is controlled by means of a control pressure controlled by a pilot valve. The pilot valve is electrically operated. It is preferably an electromagnetic valve or a solenoid valve.

In another embodiment, the main valve is directly controlled and the current of the controller of the main valve is detected.

In addition or as an alternative to the current measurement during the blowing process, a pressure in the region of the interior of the preform, preferably in a connecting line from the valve to the preform, is preferably measured, and the time of the pressure measurement is likewise recorded.

As an alternative or in addition to the current measurement and the pressure measurement in the interior of the preform, a pressure in the region of a tank of the process fluid is measured during the blowing process, and the time of the pressure measurement is recorded.

These two pressure measurements make it possible to record a pressure characteristic. These pressure measurements, especially if they are compared with pressure characteristics of earlier measurements or with theoretically calculated or empirically determined theoretical pressure characteristics, provide information about the status and about ageing processes of the valve units and possibly also about other areas of the blow-moulding device. They can be used for the early detection of service work and of the need to replace components, such as the valve units, for example. As an alternative or in addition, they can be used for controlling the process parameters, such as switching cycles, switching times and the level of the applied pressures.

Preferably, distinctive points in the pressure characteristic are detected and compared with distinctive points in previously known and/or theoretically determined pressure characteristics, and the data are evaluated accordingly. Evaluation can comprise calculation. However, other types of evaluations can also be used. In this text, this applies in general to the definition of the term "evaluation".

The measured pressure values are preferably evaluated taking into account the measured values of the current.

The blowing valve assembly according to the invention of a blow-moulding device for producing a hollow body has at least one process valve unit for feeding a process fluid into a preform of the hollow body under process pressure, wherein the process valve unit has at least one electrically operated valve. According to the invention, a means for detecting an electric current value of the electrically operated valve during a blowing process is present. As an alternative or in addition, a pressure sensor is preferably provided for measuring the pressure in the region of the interior of the preform.

Further embodiments and variants of the method are specified in the dependent claims.

It is an object of a further invention claimed herein to detect malfunctions in blow-moulding machines as early as possible.

The method according to the invention serves to monitor a blow-moulding unit of a plurality of blow-moulding stations for producing a hollow body. Each blow-moulding station has at least one process valve unit for feeding a process fluid into a preform of the hollow body under process pressure, wherein the process valve unit has at least one valve. Each blow-moulding station is associated with at least one sensor. The method has at least the following steps:
  detecting at least one first sensor value in each blow-moulding station,
  transmitting a first data value, which is associated with the at least one detected first sensor value of each blow-moulding station, to a data processing unit, and
  determining a first statistical average of the transmitted first data values in the data processing unit.

Preferably, the method additionally comprises defining the first statistical average as a setpoint.

Instead of forming an average, the individual first sensor values of the various stations can also be compared with one another without forming an average, the sensor values preferably having been measured in the same blowing process, i.e. very close together in time, or alternatively at different times in different blowing processes. As an alternative or in addition, the data of the same measuring station, measured in different blowing processes, i.e. at different times, can be compared with one another. All this is likewise claimed as separate inventions.

Thus, the method according to one aspect of the invention is based on comparative measurement and analysis. In this way, outliers from the norm can be detected quickly. In this case, the setpoint is not predetermined; in particular, it is not calculated on the basis of theoretical principles. On the contrary, use is made of a statistical average which has been determined empirically. This is advantageous particularly if the interface between the machine controller, which knows the formulation, and the data processing unit does not transmit any process parameters and thus the manufacturer of the valve blocks and the associated actuator boxes does not know the formulation. Nevertheless, the manufacturer of the valve blocks and actuator boxes can provide a useful analytical tool for detecting problems in the valve block at an early stage, but also in other areas of the blow-moulding station.

In a preferred variant of the method, the transmitted first data value is the detected first sensor value itself. In other embodiments, the first data value is a difference or some other suitable type of conversion of the sensor value.

The blow-moulding unit preferably has a central controller which directly or indirectly controls the individual blow-moulding stations. In a preferred variant of the method, the defined setpoint is stored in this central controller and serves for the further control of the individual blow-moulding stations.

The data processing unit can be designed as a separate functional unit. It is preferably part of the central controller. Even if it is part of the central controller, it is, depending on the embodiment, a module separate from the machine controller. As a result, this module can be produced and supplied, for example, by the valve block manufacturer and the machine controller, which has the formulation, i.e. the operating parameters for the blow-moulding unit and the individual blow-moulding stations, can be produced separately by another manufacturer.

In a preferred variant, the data processing unit is formed by a plurality of decentralized data processing units, these being part of decentralized control units. In this case, the machine controller or some other part of a central controller preferably supplies the relevant parameters of the formulation to the decentralized control units. At least the defined setpoint is preferably stored in the decentralized control units.

In a preferred variant of the method according to the invention, it has at least the following further steps:
  determining whether individual transmitted first sensor values have a predetermined deviation from the first statistical average, and,
  if an individual first sensor value has such a deviation, identification of the blow-moulding station associated with the sensor value.

This makes it easy to determine if a problem occurs in a blow-moulding unit at one of the blow-moulding stations since its sensor value deviates from the corresponding sensor values of the other blow-moulding stations in a statistically relevant form. It is advantageous that this blow-moulding station can be identified, so that a corresponding report can be issued and, if necessary, corresponding measures can be taken. The measures can be the brief shutdown of the corresponding blow-moulding station or some other type of control of this station.

In another preferred variant of the method according to the invention, the method has at least the following further steps:
  detecting at least one second sensor value in each blow-moulding station in a second blowing process,
  transmitting the at least one detected second sensor value of each blow-moulding station to the data processing unit, determining a second statistical average of the transmitted second sensor values in the data processing unit.

Preferably, in case of deviation of the second statistical average from the first statistical average, the second statistical average is defined as a setpoint.

Since the second sensor values are measured in a second blowing process, that is to say at a later time, it is possible to find out in a simple manner whether the formulation has changed. If the second sensor values in all the blow-moulding stations have changed in a similar manner in comparison with the first sensor values, it can be assumed that the blow-moulding stations are continuing to operate correctly and that the formulation has changed between the two detection times. The comparison can be carried out as described above via the formation of the average. Alternatively, and this is claimed separately here, the individual first and second sensor values of the respective blow-moulding station can also be compared with one another in each case, without averaging.

If the quality of the end product, i.e. the inflated hollow body, is satisfactory, no measures are required in the controller. Otherwise, corresponding measures can be taken, e.g. a further adaptation of the formulation. If the end product is satisfactory, the new statistical average can be used as a setpoint for later similar processes.

The method according to the invention preferably has at least the following further steps:
either determining whether individual transmitted second sensor values have a predetermined deviation from the first statistical average, or determining whether individual transmitted second sensor values have a predetermined deviation from the second statistical average, and,
if an individual second sensor value has such a deviation, identification of the blow-moulding station associated with the sensor value.

Preferably, after the second statistical average has been determined, individual second sensor values which deviate from the second statistical average or, alternatively, from the first statistical average are determined. The remaining second sensor values are then used to form a new second statistical average. If this new second statistical average deviates from the first statistical average, only this new second statistical average is defined as a setpoint for the blow-moulding stations.

These additional steps serve to determine a new statistical average, which is to serve as a new setpoint, as accurately as possible. This is done by excluding any blow-moulding stations whose functioning is problematic from this determination of the average.

In this variant as well, the transmitted second data value is preferably the detected second sensor value, and in these cases too it can be a processed sensor value, for example a difference. For example, in all the methods described, the transmitted first and/or the second data value are the difference between the detected first sensor value and the stored setpoint.

In a preferred variant of the method according to the invention, the at least one sensor measures at least one of the following parameters: pressure in the hollow body to be produced, pressure in a fluid tank, current of a pilot valve, position or movement of the piston of a process valve.

The control system according to the invention for a blow-moulding unit has a plurality of blow-moulding stations, wherein the blow-moulding unit has a central control unit and wherein each blow-moulding station is associated with at least one sensor. The blow-moulding unit has at least one data processing unit, wherein the at least one data processing unit has evaluation means for forming a statistical average from data which are based on the sensor values obtained from the sensors. The blow-moulding unit has storage means for storing the determined statistical average as a setpoint.

Preferably, there is a machine controller which, together with the at least one data processing unit, forms a central control unit.

The computer program product according to the invention is used to carry out the method described above and the variants thereof.

Further embodiments and variants of the method are specified in the dependent claims.

BRIEF DESCRIPTION OF THE DRAWINGS

A preferred embodiment of the invention is described below by means of the drawings, which serve merely for explanation and should not be interpreted as restrictive. In the drawings:

FIGS. 5a to 5c show a portion of a graphical representation of measured values during a blowing process;

FIGS. 6a and 6b show a graphical representation of measured values during part of a blowing process;

FIGS. 7a to 7c show a graphical representation of measured values during part of three different blowing processes;

FIGS. 8a to 8c show a graphical representation of measured values during a complete blowing process;

FIG. 13a shows a longitudinal section through a process valve according to the invention in a second embodiment in the open state;

FIG. 13b shows a longitudinal section through a process valve according to the invention in a second embodiment in the closed state;

DESCRIPTION OF THE INVENTION

Figure 1:
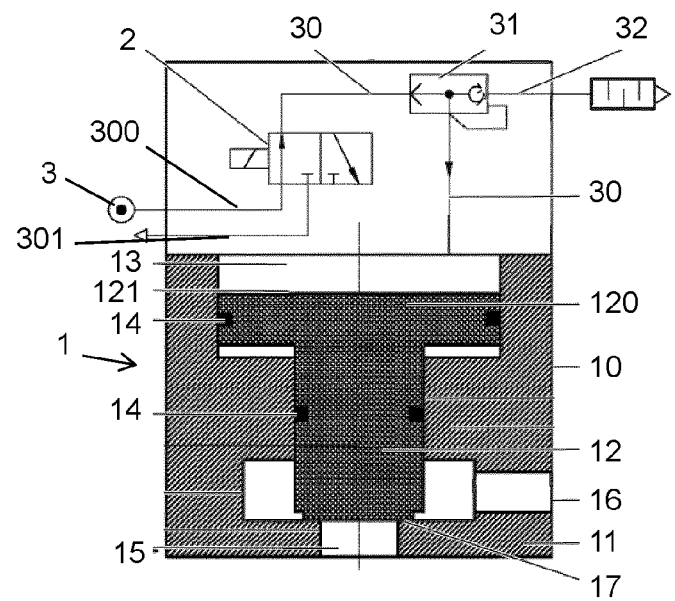
FIG. 1 shows an exemplary example of a process valve having a pneumatic main valve and a pilot valve in the closed state of the main valve in a schematic illustration.
Figure 2:
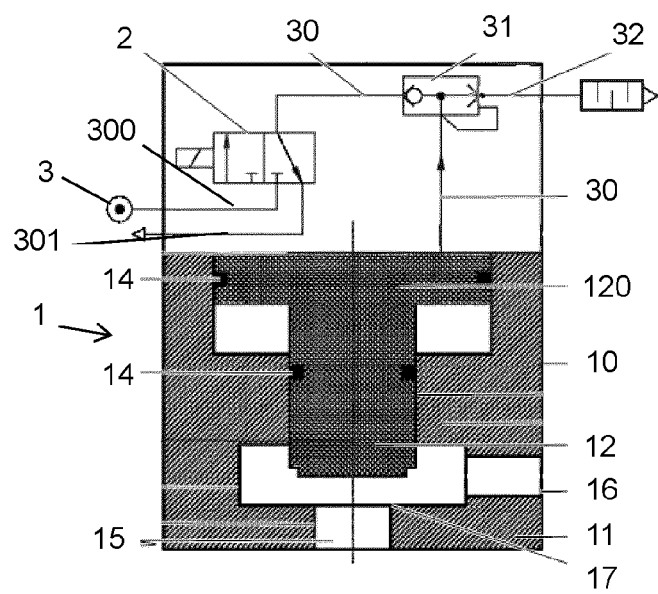
FIG. 2 shows the process valve according to FIG. 1 in the open state of the main valve.

FIGS. 1 and 2 show a typical process valve. However, the invention is not restricted to this type of valve, but can also be used in other valves which use an electronically actuated auxiliary or main valve. In particular, the invention can be used for pilot-controlled process valves which have a pneumatic main valve and at least one pilot valve, in particular at least one solenoid valve. In other embodiments, the main valve is directly controlled.

The process valve shown schematically here has a pneumatic main valve 1 and a pilot valve 2 in the form of an electromagnetic valve, i.e. a solenoid valve.

The main valve 1 has a valve housing 10 with a control chamber 13, a process pressure inlet channel 15 and a process pressure outlet channel 16. A switching piston 12 is held slidably in the valve housing 10, being sealed with respect to the valve housing 10 by means of high-pressure seals 14. It is usually of rotationally symmetrical design. In the closed state of the main valve 1, as shown in FIG. 1, the switching piston 12 rests on a valve seat 17 and thereby closes a connection between the process pressure inlet channel 15 and the process pressure outlet channel 16. In the open state according to FIG. 2, this connection is open. In the open state of the main valve 1, the process gas can thus pass from the process gas source (not shown here) into the preform or blank (likewise not shown here) and inflate the latter to the desired final shape of the hollow body, in particular the PP or PET bottle.

The control chamber 13 of the main valve 1 is connected to a control air source 3 via a control air line 30. The pressurized control air acts in the control chamber 13 on a control surface 121 of a piston head 120 of the switching piston 12. The resulting control pressure generates a force on the switching piston 12 which is greater than the force of the process gas pressure acting via the process pressure inlet channel 15 on the opposite side of the switching piston 12. As a result, the switching piston 12 is held in its closed position.

If the control pressure is lowered, the process gas presses the switching piston 12 upward, and the main valve 1 is opened.

The switching of the control pressure is accomplished by means of said pilot valve 2. As shown here, this is connected to the control chamber 13 via the control air line 30. It is furthermore connected via a control air inlet channel 300 to the control air source 3 and via a control air outlet channel 301 to the surroundings or to a control air recovery unit. For the rapid venting of the control chamber, a control air switching chamber 31 can be provided, as shown here, which ensures minimum switching times by means of an additional venting channel 32. A process valve of this kind is described in detail in WO 2015/010216 A1, for example. It serves merely as an example for understanding possible functions of the main valve and of the at least one pilot valve.

In other embodiments, the control pressure actuated by means of the pilot valve 2 serves to open the main valve 1. In further embodiments, a first pilot valve having a first control pressure is used for opening and a second pilot valve having a second control pressure is used for closing the main valve 1. In further embodiments, control is accomplished by means of a 5/2-way pilot valve, in which either air admission takes place at the top and venting takes place at the bottom or vice versa.

Figure 4:
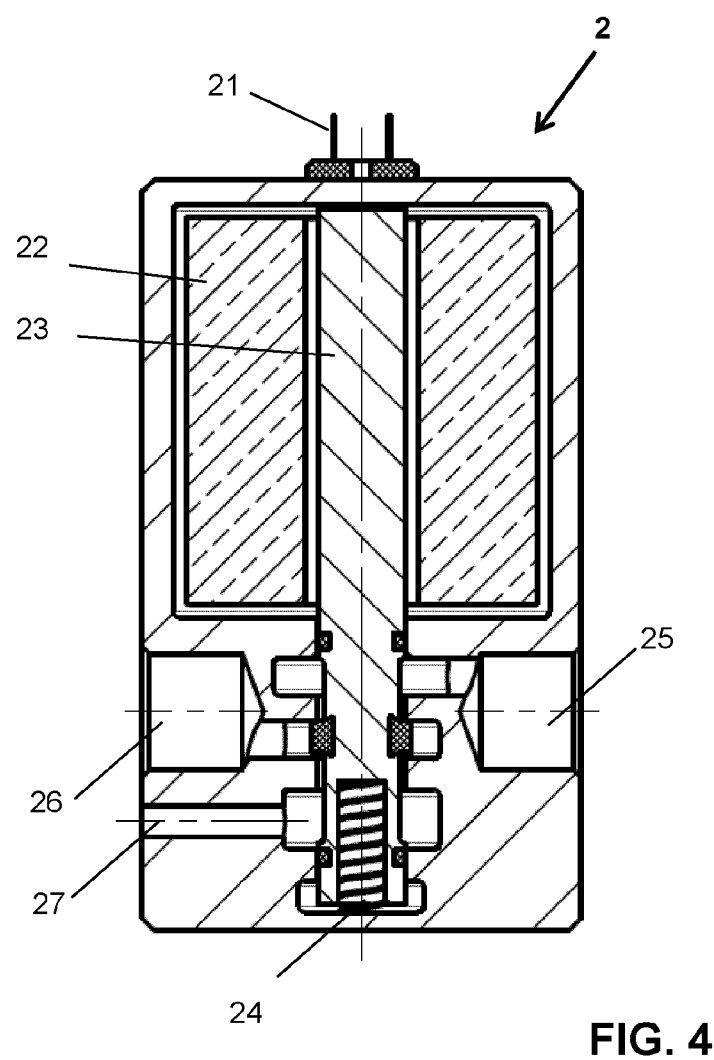
FIG. 4 shows a longitudinal section through a pilot valve.

FIG. 4 shows an example of a pilot valve 2 of the kind typically used in such process valves. This is just an example. Other types of pilot valve can also be used. The pilot valve 2 shown here has a housing in which an electromagnet coil 22 and a plunger 23 passing through the coil 22 are arranged. A spring 24 is arranged at one end of the plunger 23. The plunger 23 can be moved against the force of this spring 24 by means of the electromagnet. As a result of the movement of the plunger 24, a connection to the pressure supply is released. The connection to the pressure supply is provided with the reference numeral 25. In the no-load state, a connection to the control chamber of the main valve is created. The corresponding outlet is provided with the reference numeral 26. In addition, an outlet 27 to a muffler is preferably provided.

Figure 3:
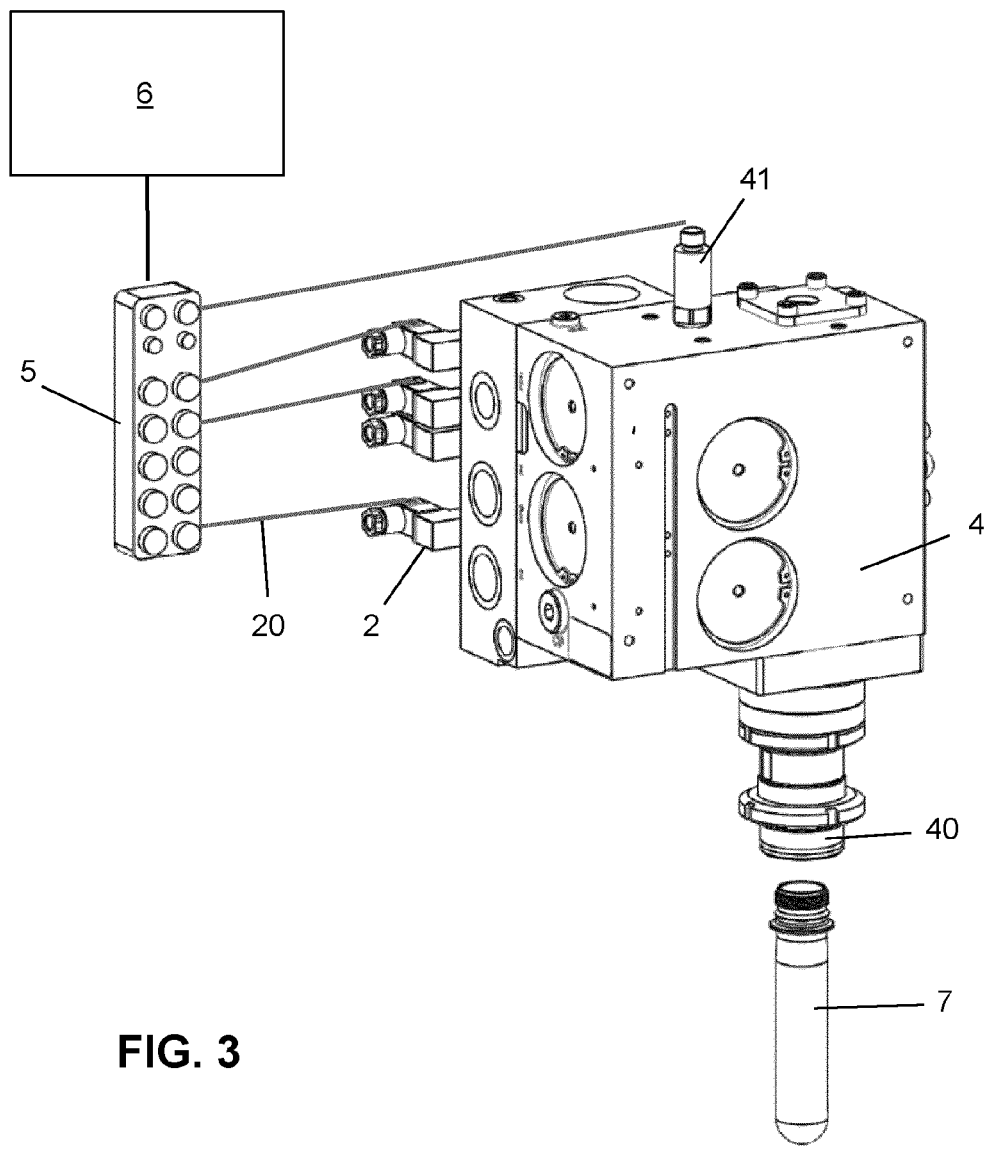
FIG. 3 shows a unit, as used in a blow-moulding machine, with valve block and actuator box.

More than one process valve is usually necessary for producing a hollow body from a blank. A preblowing valve and at least one main blowing valve are usually present. Furthermore, at least one recovery valve and/or one vent valve are preferably present. As shown in FIG. 3, these valves are preferably arranged in a common valve block 4, which has at least one, preferably a plurality of, process pressure inlet and outlet channels for connection to the process gas source. By means of the process gas, the preform is inflated into the desired shape of the final hollow body. For this purpose, the valve block 4 has a blowing nozzle 40, on which the blank or preform 7 to be inflated is secured.

The valve block 4 furthermore has at least one pressure sensor 41, which measures the pressure of the process gas in the region of the nozzle 40. This corresponds, with minimal and thus negligible delay, to the pressure which prevails in the interior of the blank 7.

The individual pilot valves 2 of the individual process valves are connected via respective electronic control connections 20 to an actuator box 5, which in turn is connected directly or via further control subunits to the machine controller 6 or which itself is already part of the machine controller 6. The actuator box 5 and the machine controller 6 are referred to below as a control unit.

The control unit controls the pilot valves 2 and thus the process valves. It also receives the measurement data of the at least one pressure sensor 41.

According to the invention, the control unit, preferably the actuator box 5, measures the current of at least one, preferably all, pilot valves 2. The current can be measured at a predetermined time or the time at which a specific current value is reached can be determined. The time of the counterpeak of the current at the end of counterinduction is preferably determined when the pilot valve 2 is switched on and off. In the most preferred embodiment, the current measurement takes place at predetermined time intervals, for example every 0.1 ms.

Measurement is carried out using customary and known means. Measurement is carried out, for example, by installing a measuring resistor in the circuit to the pilot valve. Across this resistor there is a voltage drop, the magnitude of which is subsequently amplified. The magnitude of this voltage drop is proportional to the current flowing.

The measured current values and/or the measured times of the occurrence of distinctive current values, for example the reversal point in the counterinduction, are compared with previous measured values and/or with predefined values. On the basis of a deviation of these values compared with one another, conclusions are drawn about the ageing process and/or the state of the pilot valve 2. In this way, it is also possible to determine and observe valve properties, such as delays, accuracy and wear. If the deviation is such that, based on empirical values, imminent failure of the pilot valve 2 is probable, then an error message is generated by the control unit and there is a request for the corresponding pilot valve 2 to be changed. In one embodiment, compensation of the deviation is initiated by means of the controller before the request to change the pilot valve. In this case, the signal for valve switching is requested earlier, preferably in accordance with the magnitude of a detected delay in the current characteristic of the pilot valve. In this way, the service life of the pilot valve can be extended. In other embodiments, the state of the pilot valve 2 is indicated visually by the control unit, allowing the user to observe the continuous ageing process of the pilot valve 2 at an early stage.

FIGS. 5a to 5c show a portion of a typical process sequence at the time of the start of the process with the preblowing. In curve a), FIG. 5a shows the pressure characteristic $P_T$ in the process pressure source, i.e. the tank pressure as a function of time t. Curve b) shows the pressure $P_R$ which was measured by the pressure sensor 41 in the valve block 4 in the region of the interior of the blank as a function of time. FIG. 5b shows the voltage signal U of the pilot valve 2 measured or applied in this process as a function of the same time t as in FIG. 5a. Curve c) shows the voltage signal U of the pilot valve 2 for the preblowing valve and curve d) shows the voltage signal U of the pilot valve 2 for the main blowing valve. In FIG. 5c, the measured current value I which matches it is reproduced as a function of the same time t of the pilot valves. Curve e) shows the current value I of the pilot valve of the preblowing valve and curve f) shows the current value I of the pilot valve of the main blowing valve.

As can be clearly seen in curves e) and f), the current characteristic I has a downward-pointing peak when the pilot valve is switched on and an upward-pointing peak when it is switched off. This designates the time of the end of counterinduction $H_1$, $H_2$. According to the invention, these times $t_{H1}$ and $t_{H2}$ and/or the magnitude of the peak are detected and compared with a predetermined value by the control unit. These data are preferably stored in the control unit or in a cloud for later reuse.

Viewing FIGS. 5a to 5c together furthermore reveals the pressure behavior $P_R$ in the region of the interior of the blank in the course of the process. At time A, the voltage U is applied to the pilot valve of the preblowing valve. However, owing to the first counterinduction $H_1$, the pilot valve responds with a time delay. The internal pressure $P_R$ in the blank rises with a time delay. At time $t_B$ in curve b) of FIG. 5a, the pressure rise is for the first time sufficiently distinct from the measuring noise. The pressure at point C at time $t_C$ in curve b) according to FIG. 5a is approximately 50% of the first pressure rise (i.e. the pressure rise up to the first reduction of the pressure). The difference between times $t_C$ and $t_B$ indicates that the main valve has opened completely at the correct time.

The pressure $P_T$ in the tank has already dropped earlier, as shown by region F in curve a). At point D at time $t_D$ of curve b), the blank also begins to expand radially. According to experience, this has the result that the pressure $P_R$ in the interior of the blank drops for a short time, as can be clearly seen in curve b). This is followed by a period of time with an approximately constant pressure $P_R$ in the interior of the blank, with a subsequent rise. This can also be seen clearly in curve b).

The pilot valve of the preblowing valve is likewise switched off with a time delay with the second counterinduction $H_2$. The switching on of the main blowing valve (curve d) in FIG. 5b) and curve f) in FIG. 5c), which took place shortly thereafter, again takes place with a time delay. Point E in curve b) shows the pressure rise after switching on the main blowing valve. As can be seen in curve b), the massive rise in the internal pressure $P_R$ in the partially inflated blank follows with a time delay.

In a variant of the method according to the invention, not only are the times and/or the level of at least one of the counterinductions $H_1$ and $H_2$ determined, but the pressures are also monitored. The pressure $P_T$ in the process tank and/or the pressure $P_R$ in the outlet channel of the valve block and thus in the interior of the blank can be measured. The values are preferably measured in very short time intervals as a function of time. Alternatively, these pressures $P_T$ and/or $P_R$ can also be measured at predetermined times. These values are compared with values measured at earlier times and/or with predetermined values. Deviations are detected. If predetermined limit values and/or predetermined maximum deviations are exceeded and/or undershot, this is indicated.

Depending on the embodiment, these values are used to monitor ageing processes in the machine, in particular in the valve block and/or in the process gas tank. As an alternative or in addition, they can also be used for controlling the blow-moulding machine, for example in that the process pressure is increased or lowered, the times of actuation of the process valves are changed and/or the switching cycles of the process valves are altered.

The data of the pressure measurement $P_R$ in the interior of the blank are preferably combined with the data of the current measurement I of the pilot valves and evaluated together. This results, for example, in further knowledge on the state of the process valve, in particular on the ageing process of the remaining parts of the pilot valve and/or of the main valve.

In another embodiment, the pressure measurement $P_R$ in the interior of the blank and/or the measurement of the tank pressure $P_T$ is carried out as a function of time without the measurement of the flow I of the pilot valves, and information is obtained from this on the status of the valve properties and/or on the ageing process of the process valves. This embodiment is likewise claimed here as a separate invention.

The method according to the invention and the device according to the invention allow early detection of an ageing process of the process valves, in particular their pilot valves, and/or the detection of the status of valve properties.

Figure 15:
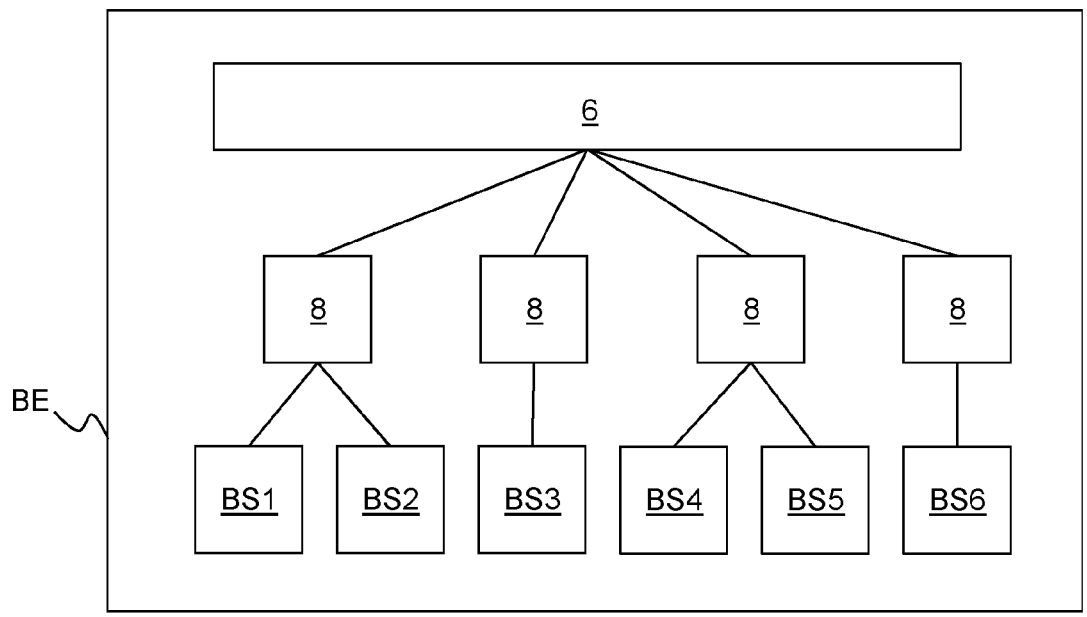
FIG. 15 shows a schematic illustration of a blow-moulding unit according to the invention.

The further invention is described below with reference to preferred embodiments and with reference to the figures:

FIG. 15 schematically shows a blow-moulding unit BE according to the invention having a plurality of blow-moulding stations BS1 to BS6. There may be two, three or more blow-moulding stations. In this example, there are six stations. Each blow-moulding station BS1 to BS6 is connected to a decentralized data processing unit 8, although it is also possible for one decentralized data processing unit 8 to be assigned to a plurality of blow-moulding stations. The decentralized data processing units 8 are connected to a central control unit 6. The control unit 6 contains the machine controller of the blow-moulding unit. Depending on the embodiment, it has a separate module, which is designed to be functionally and, depending on the embodiment, also locally separate from the machine controller, but communicates with it. This module is in communicating connection with the decentralized data processing units.

Figure 16:
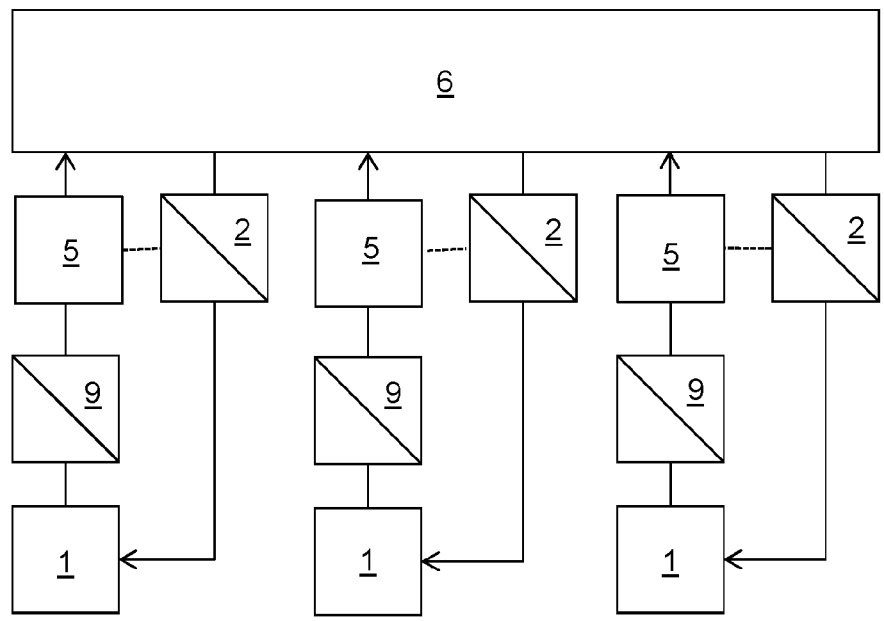
FIG. 16 shows a schematic illustration of part of a blow-moulding unit according to FIG. 15.

FIG. 16 shows parts of the blow-moulding unit BE according to FIG. 15. Only three blow-moulding stations are shown. Each blow-moulding station is illustrated in simplified form with a single main valve 1. In real blow-moulding stations, however, a plurality of valves, i.e. the abovementioned preblowing valve, one or more blowing valves and one or more recovery valves and vent valves, are present at each station. The main valve 1 is controlled by means of a pilot valve 2. A typical exemplary embodiment of such a valve 1 with a pilot valve 2 is described below with reference to FIGS. 1 and 2.

The pilot valve 2 is preferably controlled by the central control unit 6 or by a decentralized control unit, hereinafter referred to as actuator box 5. The valve 1 and also other regions of the corresponding blow-moulding station are connected to a sensor unit 9, which contains sensors or receives measured values from sensors.

The sensors can measure a pressure in the preform during the blowing process. The pressure can be measured over the entire process time, i.e. during preblowing, blowing, recovery and venting. It is also possible for the pressure to be measured only during a period of time of the process or at predefined times. The sensors can also measure other parameters, such as the current of the pilot valve or movements of individual parts of the blow-moulding station, in particular of the valve 1.

Depending on the embodiment, the sensor unit 9 and the decentralized control unit 5 are designed as a common module or as separate components. In place of a decentralized control unit, i.e. an actuator box 5 provided with control functions, the module can also be designed as a data processing unit without control functions. Control is then performed by the central control unit 6. Control can also be partially transferred from the central control unit 6 to the actuator box 5 or to some other decentralized control unit. It is preferable for simple control commands to be executed by means of the actuator box 5 in order to relieve the load on the central control unit 6.

FIGS. 1 and 2 show a typical process valve. It has a pneumatic main valve 1 and at least one pilot valve, in particular an electromagnetic valve, preferably a solenoid valve. However, the invention is not restricted to this type of valve. The main valve can also be controlled directly, for example.

The main valve 1 has a valve housing 10 with a control chamber 13, a process pressure inlet channel 15 and a process pressure outlet channel 16. A switching piston 12 is held slidably in the valve housing 10, being sealed with respect to the valve housing 10 by means of high-pressure seals 14. It is usually of rotationally symmetrical design. In the closed state of the main valve 1, as shown in FIG. 15, the switching piston 12 rests on a valve seat 17 and thereby closes a connection between the process pressure inlet channel 15 and the process pressure outlet channel 16. In the open state according to FIG. 16, this connection is open. In the open state of the main valve 1, the process gas can thus pass from the process gas source (not shown here) into the preform or blank (likewise not shown here) and inflate the latter to the desired final shape of the hollow body, in particular the PP or PET bottle.

The control chamber 13 of the main valve 1 is connected to a control air source 3 via a control air line 30. The pressurized control air acts in the control chamber 13 on a control surface 121 of a piston head 120 of the switching piston 12. The resulting control pressure generates a force on the switching piston 12 which is greater than the force of the process gas pressure acting via the process pressure inlet channel 15 on the opposite side of the switching piston 12. As a result, the switching piston 12 is held in its closed position.

If the control pressure is lowered, the process gas presses the switching piston 12 upward, and the main valve 1 is opened.

The switching of the control pressure is accomplished by means of said pilot valve 2. As shown here, this is connected to the control chamber 13 via the control air line 30. It is furthermore connected via a control air inlet channel 300 to the control air source 3 and via a control air outlet channel 301 to the surroundings or to a control air recovery unit. For the rapid venting of the control chamber, a control air switching chamber 31 can be provided, as shown here, which ensures minimum switching times by means of an additional venting channel 32. A process valve of this kind is described in detail in WO 2015/010216 A1, for example. It serves merely as an example for understanding possible functions of the main valve and of the at least one pilot valve.

In other embodiments, the control pressure actuated by means of the pilot valve 2 serves to open the main valve 1. In further embodiments, a first pilot valve having a first control pressure is used for opening and a second pilot valve having a second control pressure is used for closing the main valve 1. In further embodiments, control is accomplished by means of a 5/2-way pilot valve, in which either air admission takes place at the top and venting takes place at the bottom or vice versa.

FIG. 4 shows an example of a pilot valve 2 of the kind typically used in such process valves. This is just an example. Other types of pilot valve can also be used. The pilot valve 2 shown here has a housing in which an electromagnet coil 22 and a plunger 23 passing through the coil 22 are arranged. A spring 24 is arranged at one end of the plunger 23. The plunger 23 can be moved against the force of this spring 24 by means of the electromagnet. As a result of the movement of the plunger 24, a connection to the pressure supply is released. The connection to the pressure supply is provided with the reference numeral 25. In the no-load state, a connection to the control chamber of the main valve is created. The corresponding outlet is provided with the reference numeral 26. In addition, an outlet 27 to a muffler is preferably provided.

More than one process valve is usually necessary for producing a hollow body from a blank. A preblowing valve and at least one main blowing valve are usually present. Furthermore, at least one recovery valve and/or one vent valve are preferably present. As shown in FIG. 3, these valves are preferably arranged in a common valve block 4, which has at least one, preferably a plurality of, process pressure inlet and outlet channels for connection to the process gas source. By means of the process gas, the preform is inflated into the desired shape of the final hollow body. For this purpose, the valve block 4 has a blowing nozzle 40, on which the blank or preform 7 to be inflated is secured.

The valve block 4 furthermore has at least one pressure sensor 41, which measures the pressure of the process gas in the region of the nozzle 40. This corresponds, with minimal and thus negligible delay, to the pressure which prevails in the interior of the blank 7. The pressure sensor 41 forms part of the abovementioned sensor unit 9. Depending on the embodiment, further sensors are also present.

The individual pilot valves 2 of the individual process valves are connected via respective electronic control connections 20 to an actuator box 5, which in turn is connected directly or via further control subunits to the machine controller 6 or which itself is already part of the machine controller 6. Depending on the embodiment, the actuator box 5 has a processor and other means for control and/or data processing. The actuator box 5 and the machine controller 6 are referred to below as a control system.

The control system controls the pilot valves 2 and thus the process valves. Moreover, it receives the measurement data of the at least one pressure sensor 41 and any other sensors which supply data about the blowing process.

FIGS. 6a to 6b show a portion of a typical process sequence at the time of the start of the process with the preblowing. In curve b), FIG. 6a shows the pressure $P_R$ which was measured by the pressure sensor 41 in the valve block 4 in the region of the interior of the blank as a function of time t. FIG. 6b shows the voltage signal U of the pilot valve 2 measured or applied in this process as a function of the same time t as in FIG. 6a. Curve c) shows the voltage signal U of the pilot valve 2 for the preblowing valve and curve d) shows the voltage signal U of the pilot valve 2 for the main blowing valve.

Viewing FIGS. 6a and 6b together furthermore reveals the pressure behavior $P_R$ in the region of the interior of the blank in the course of the process. At time A, the voltage U is applied to the pilot valve of the preblowing valve. The pilot valve responds with a time delay and thus the internal pressure $P_R$ in the blank rises with a time delay. At time $t_B$ in curve b) of FIG. 6a, the pressure rise is for the first time sufficiently distinct from the measuring noise. The pressure at point C at time $t_C$ in curve b) according to FIG. 6a is approximately 50% of the first pressure rise (i.e. the pressure rise up to the first reduction of the pressure). The difference between times $t_C$ and $t_B$ indicates that the main valve has opened completely at the correct time.

At point D at time $t_D$ of curve b), the blank also begins to expand radially. According to experience, this has the result that the pressure $P_R$ in the interior of the blank drops for a short time, as can be clearly seen in curve b). This is followed by a period of time with an approximately constant pressure $P_R$ in the interior of the blank, with a subsequent rise. This can also be seen clearly in curve b).

The pilot valve of the preblowing valve is likewise switched off with a time delay. The switching on of the main blowing valve (curve d) in FIG. 6b), which took place shortly thereafter, again takes place with a time delay. Point E in curve b) shows the pressure rise after switching on the main blowing valve. As can be seen in curve b), the massive rise in the internal pressure $P_R$ in the partially inflated blank follows with a time delay.

FIGS. 7a to 7c show a similar portion of a blowing process, three different blowing processes being superimposed in time in the graphic. FIG. 7a shows the pressure characteristic $P_R$, measured in the region of the blank, i.e. of the preform, during the preblowing process and at the beginning of the blowing process with increased pressure. FIG. 7b shows the voltage U applied to the pilot valve 2 as a function of time. FIG. 7c simultaneously shows the current I measured at the pilot valve 2 as a function of time.

The time indications $t_A$, $t_B$, $t_C$, $t_D$ and $t_E$ relate to the solid curve I of a first blowing process. In a second blowing process, illustrated by the dashed curve II, the beginning of the blowing process is delayed, for example because the switching piston 12 of the main valve 1 responds too late and opens too late. In a third blowing process, illustrated by the dotted curve III, the beginning of the blowing process is correct but the pressure increase is delayed, for example because the switching piston 12 of the main valve 1 moves too slowly.

In a variant of the method according to the invention, the three curves illustrated have been produced by pressure measurement in the same blow-moulding station during three blow-moulding operations separated in time, i.e. the same behavior of the same valves 1 has been recorded at different times. In another variant, the pressure curves of different blow-moulding stations of the same blow-moulding unit are compared with one another. In this case, these curves were produced as close to one another in time as possible. The blow-moulding stations are usually operated with a very small time difference between them. FIGS. 8a to 8c show a complete blowing process of a single blow-moulding station. FIG. 8a again shows the pressure $P_R$ in the blank as a function of time t, FIG. 8b shows the voltage U applied to the individual pilot valves as a function of the same time t, and FIG. 8c shows the current I of the pilot valves as a function of the same time t.

In region V, preblowing takes place with a preblowing valve, and, in region H, blowing takes place at elevated pressure and using a blowing valve. In region R1, recovery is carried out by means of a first recovery valve, and, in region R2 recovery is continued by means of a second recovery valve or a vent valve or venting takes place directly into the surroundings. Finally, the inflated hollow body is ejected from the blow mould. This is a well-known pressure curve of a typical blowing process. These pressure curves can also have further regions, e.g. if the blowing process is operated with two or more blowing valves connected at successive times in each case at a higher pressure than the previous stage.

These curves can be recorded in the central controller 6 or in the decentralized data processing unit 8 on the basis of the measured sensor values. The values are preferably measured in very small time intervals, for example in 0.1 ms to 1 ms. The sensor values are thus preferably detected at high frequency, for example 1,000 to 10,000 times per second. As a result, relatively accurate curves can be mapped.

However, this curve does not have to be recorded. In addition or preferably as an alternative to such a recording, tables of the measured values are produced. The tabular form facilitates statistical processing of the data.

The values in the tables or in the curves of the same blow-moulding station for various completed blowing cycles (i.e. a blowing process from preblowing to ejection of the hollow body produced) can be compared with one another, and/or the values in the tables or in the curves of the various blow-moulding stations of the blow-moulding unit can be compared with one another for the same blowing cycle or for blowing cycles lying close to one another. In this case, the values in the tables or in the curves of an entire blowing process, or only a portion thereof, or else only distinctive points in the curves and tables, such as maxima, minima and linear regions, can be taken into account in the further evaluation.

Figure 9:
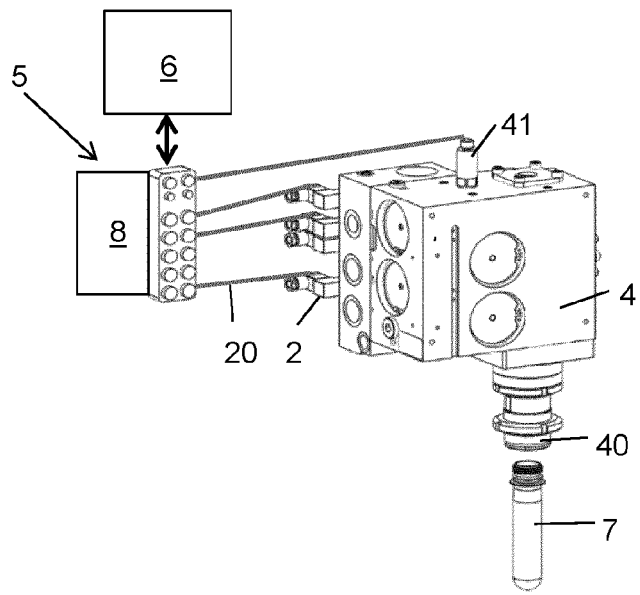
FIG. 9 shows a schematic illustration of part of a blow-moulding unit according to the invention in a first embodiment.
Figure 10:
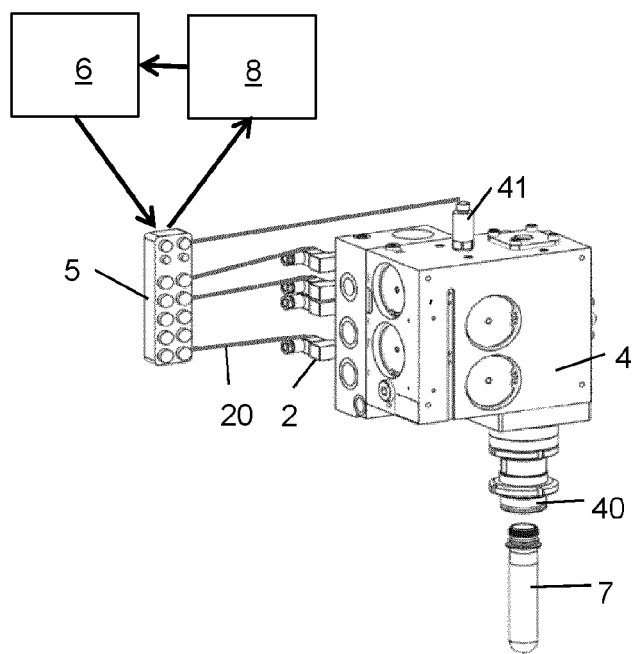
FIG. 10 shows a schematic illustration of part of a blow-moulding unit according to the invention in a second embodiment.
Figure 11:
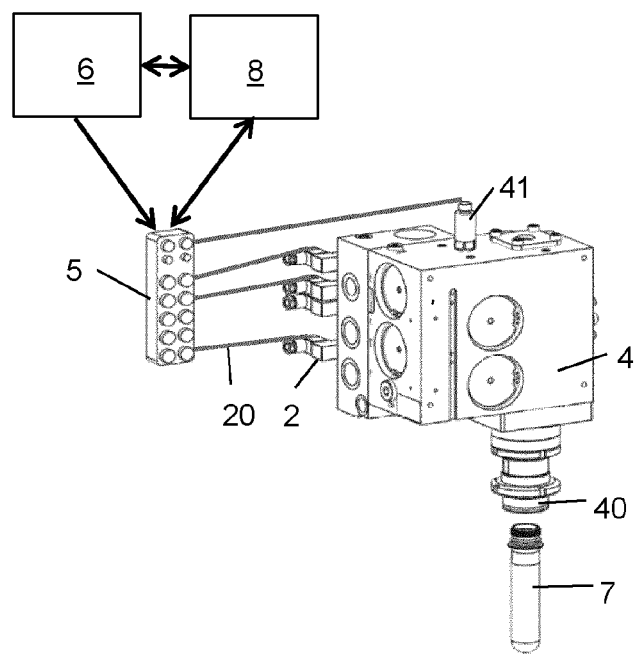
FIG. 11 shows a schematic illustration of part of a blow-moulding unit according to the invention in a third embodiment.

FIGS. 9 to 11 show part of the blow-moulding unit, the interaction of the central control unit 6 and the decentralized data processing unit 8 being evident. The central control unit 6 forms the machine controller. In these figures, it is shown with an actuator box 5 and a valve block 4 of a blow-moulding station. It is connected via corresponding connections, in this case a BUS, to a plurality of such blow-moulding stations, for example to forty stations.

In the embodiment according to FIG. 9, the actuator box 5 forms the data processing unit 8. It collects the sensor values, maps them in curves and/or tables, statistically evaluates them and delivers the result, e.g. a report on the valve state, a recommendation for correction or a new setpoint for further control, to the central control unit 6 via the BUS system. In this case, the actuator box 5 preferably also has control functions. In this embodiment, the data of the same blow-moulding station, but not the data of different blow-moulding stations, can be compared with one another at different times.

In the embodiment according to FIG. 10, an additional module in the form of a central data processing unit is present in addition to the actuator box 5, which actuates the valve block 4 in accordance with its own control commands and/or control commands received from the machine controller, depending on the variant of the embodiment. This, together with the machine controller, forms the central control unit. The central data processing unit 8 collects the data of all the blow-moulding stations of this blow-moulding unit, compares them with one another, statistically evaluates them and sends the result to the machine controller, e.g. a report on the valve state, a recommendation for correction or a new setpoint for further control. In this embodiment, the data of a single blow-moulding station and also the data of different blow-moulding stations can now be compared with one another.

In the embodiment according to FIG. 11, the same construction and the same functioning are present as in the embodiment according to FIG. 10. In addition, however, the central data processing unit has control functions. The machine controller supplies the formulation, i.e. the parameters for producing the desired hollow body, to this central data processing unit and the latter transmits corresponding control commands to the various actuator boxes 5 of the individual blow-moulding stations.

The method according to the invention permits early detection of malfunctions in blowing processes.

FIGS. 12 to 14 show alternatives or additions to the pressure measurement in the blank and in the hollow body. The measuring methods and the devices presented here serve to control the valves in a manner which is as accurate and error-free as possible without having to consider the blowing process as a whole. This has the advantage that errors can be detected more easily since the measurements are not exposed to a multiplicity of mutually influencing process factors.

FIGS. 12 to 14 again show a pneumatically pilot-controlled main valve 1 which is used as a process valve in a blowing process. It can be, for example, a preblowing valve, a main blowing valve, a recovery valve or a vent valve. It is preferably once again pilot-controlled by means of at least one pilot valve 2, in particular a solenoid valve. The same reference numerals were used as for the valve in FIGS. 1 and 2. Identical parts are provided with the same reference signs. The upper part of the valve housing 10, which forms the upper end of the control chamber 13, is provided here with the reference numeral 100.

According to the invention, sensors are then mounted in or on the valve housing 10 which directly monitor the position and/or the movement of the switching piston 12 and/or draw conclusions about its position and/or its movement from reactions which are caused by the switching piston 12.

Figure 12A:
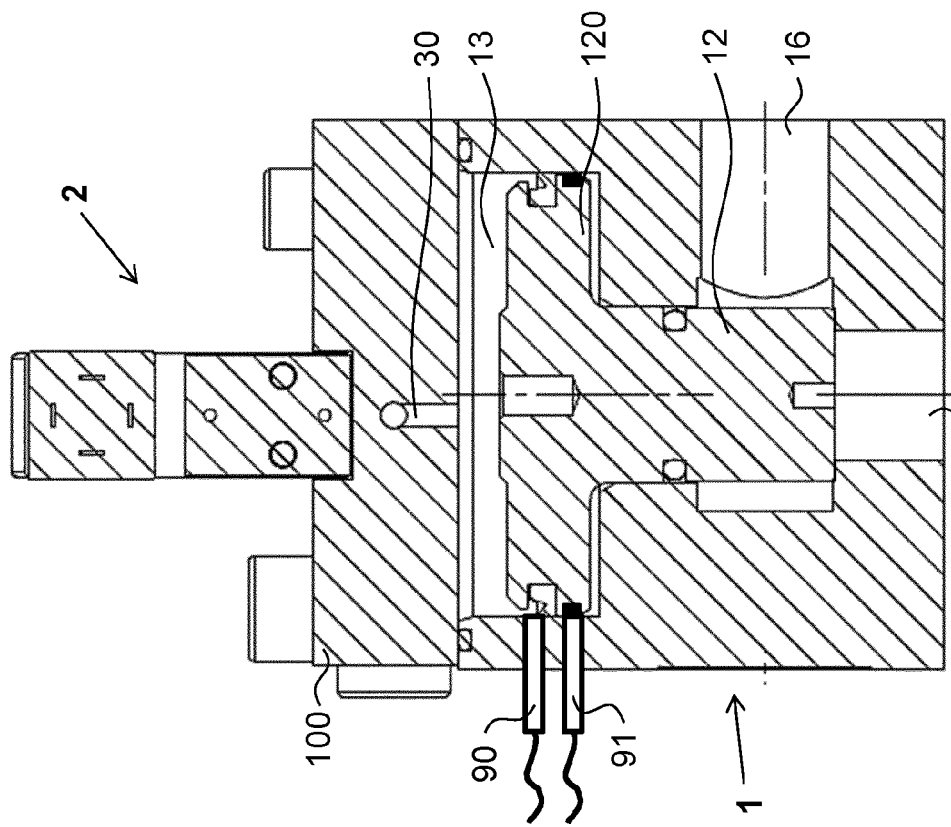
FIG. 12a shows a longitudinal section through a process valve according to the invention in a first embodiment in the open state.
Figure 12B:
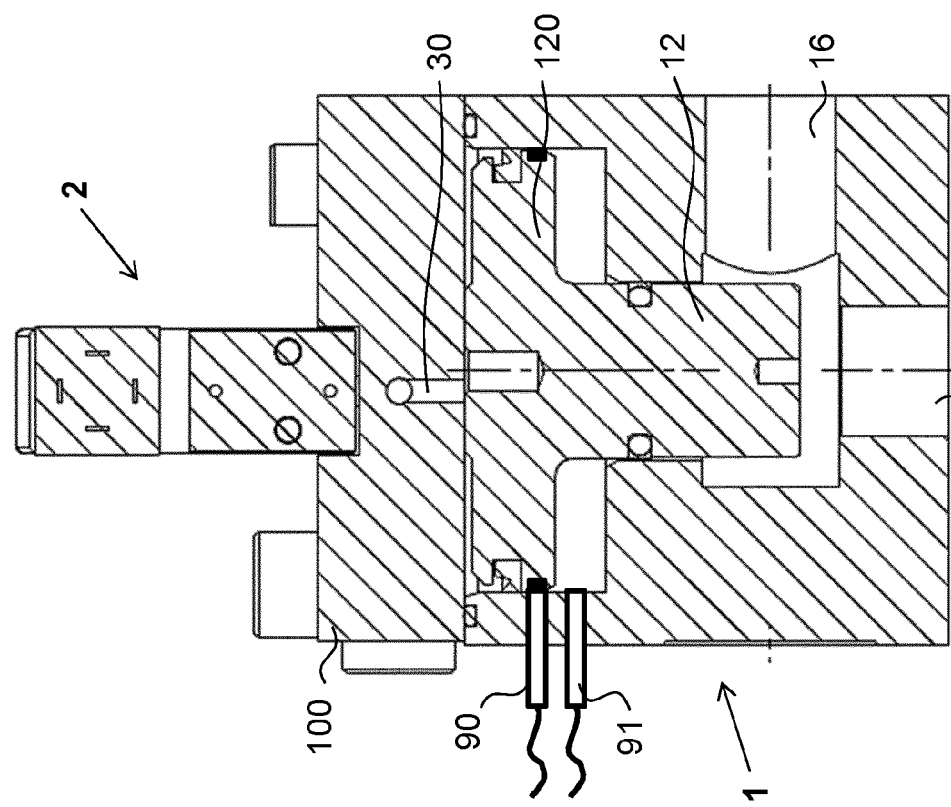
FIG. 12b shows a longitudinal section through a process valve according to the invention in a first embodiment in the closed state.

In the embodiment according to FIGS. 12*a* and 12*b*, two position sensors 90, 91 are present, which detect the position of the switching piston in its open and in its closed position. One position sensor would be sufficient, but two sensors enable more reliable measurement. In FIG. 12*a*, the switching piston is shown in the open position and the first position sensor 90 detects the switching piston 12. In FIG. 12*b*, the valve is shown in the closed position and the second position sensor 91 detects the switching piston 12. Thus it is possible to detect the time at which the piston movement begins and the time at which the open end position of the piston is reached. Suitable position sensors 90, 91 are, for example, proximity sensors, for example optical sensors or Hall-effect sensors. A marking on the piston, shown in black in the drawings, facilitates detection of the position.

In the embodiment according to FIGS. 13*a* and 13*b*, a displacement measuring sensor 92 is present, which measures the displacement of the switching piston 12. The displacement measuring sensor 92 is preferably arranged in the control chamber 13. FIG. 13*a* again shows the situation when the valve is open and FIG. 13*b* shows the situation when the valve is closed. As sensors, it is possible, for example, to use displacement measuring sensors with an analog output signal, ultrasonic sensors and load triangulation sensors.

Figure 14A:
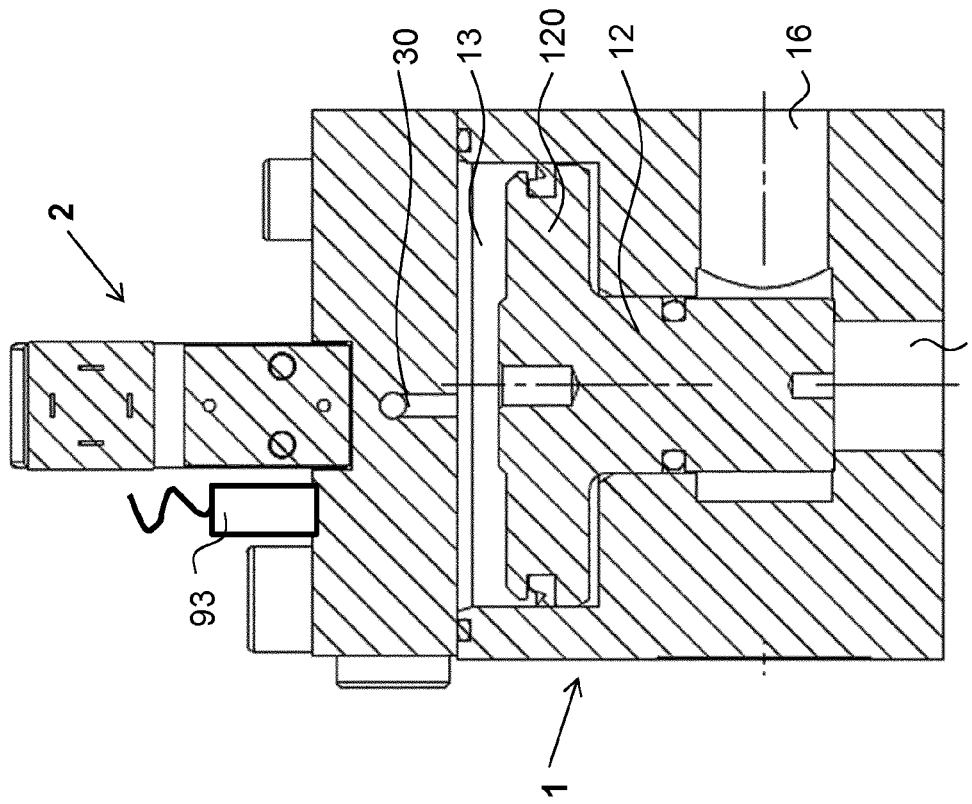
FIG. 14a shows a longitudinal section through a process valve according to the invention in a third embodiment in the open state.
Figure 14B:
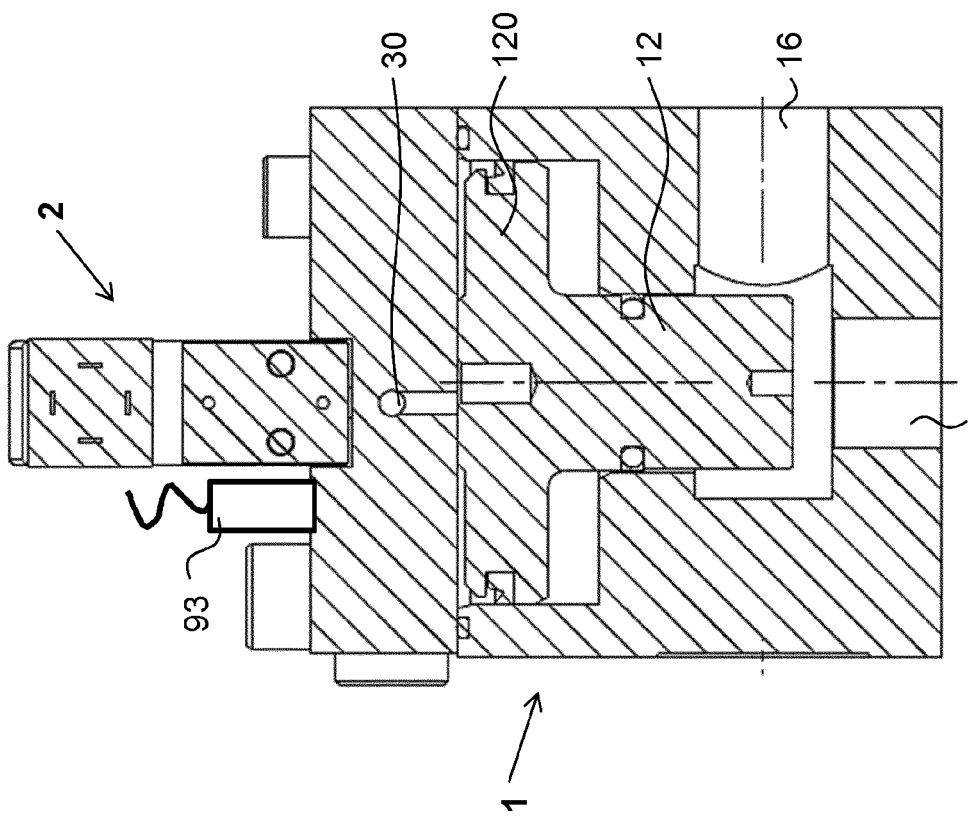
FIG. 14b shows a longitudinal section through a process valve according to the invention in a third embodiment in the closed state.

In the embodiment according to FIGS. 14*a* and 14*b*, a vibration sensor 93 is arranged in the valve housing 10. When the switching piston 12 is moved, the housing 10 vibrates and the sensor 93 responds. If the valve does not switch, or switches too slowly or with a delay, this is recorded by the sensor 93. If a plurality of valves is arranged in a common valve block, a single vibration sensor 93 is usually sufficient for all these valves since they are usually actuated successively in time and thus the sensor signal can be unambiguously assigned in each case to a specific valve. It is also possible to use an acceleration sensor instead of a vibration sensor.

These valves can also be used in other blow-moulding units without the data evaluation and control according to the invention. The corresponding measuring methods as well as the corresponding valves and valve blocks are thus likewise claimed as a separate invention.

The invention claimed is:

1. A method for monitoring a blow-moulding device for producing a hollow body, wherein the blow-moulding device has at least one process valve unit for feeding a process fluid into a preform of the hollow body under process pressure, and wherein the process valve unit has at least one electromagnetically actuated valve, wherein a distinctive point of a characteristic of an electric current of the electromagnetically actuated valve is detected during a blowing process, wherein the distinctive point is a reversal point in a counterinduction of the electromagnetically actuated valve, wherein a time of an occurrence of the reversal point is measured, and wherein the time is compared with at least one of a previous measured value and a predefined value, for at least one of detection of an actual malfunction and observation of an ageing process.

2. The method as claimed in claim 1, wherein a characteristic of the electric current is detected during the blowing process.

3. The method as claimed in claim 1, wherein the current of the valve is measured in successive time intervals.

4. The method as claimed in claim 3, wherein the current of the valve is measured in successive time intervals of from 0.1 ms to 1 ms.

5. The method as claimed in claim 1, wherein a change in the current is measured.

6. The method as claimed in claim 1, wherein the time of measurement of the current is recorded together with a current value measured at this time.

7. The method as claimed in claim 1, wherein the current is measured at predetermined times.

8. The method as claimed in claim 1, wherein the process valve unit has a main valve and at least one pilot valve, wherein the at least one pilot valve controls the main valve, and wherein the characteristic of the electric current of at least one of the at least one pilot valve is detected.

9. The method as claimed in claim 8, wherein the main valve is a pneumatic valve which is operated by the process fluid and is controlled by a control pressure controlled by the at least one pilot valve.

10. The method as claimed in claim 1, wherein a pressure in the region of the interior of the preform is measured during the blowing process, and the time of the pressure measurement is recorded.

11. The method as claimed in claim 10, wherein the measured pressure values are evaluated taking into account the measured values of the current.

12. The method as claimed in claim 1, wherein a pressure in the region of a tank of the process fluid is measured during the blowing process, and the time of the pressure measurement is recorded.

13. The method as claimed in claim 12, wherein the measured pressure values are evaluated taking into account the measured values of the current.

14. The method as claimed in claim 1 wherein a derivation of measured current values is made, wherein the derivation is used to identify a local turning point which represents an end of counterinduction.

15. The method as claimed in claim 1 wherein the electromagnetically actuated valve is a pilot valve and wherein a time of an occurrence of a counterpeak of the electric current at an end of the counterinduction is determined when the is switched on and off.

16. A method for monitoring a blow-moulding unit comprising a data processing unit and a plurality of blow-moulding stations for producing a hollow body,
wherein each blow-moulding station of the plurality of blow-moulding stations has at least one process valve unit with a blowing nozzle on which a preform of the hollow body to be inflated is secured, wherein the process valve unit feeds a process fluid into the preform under process pressure thereby inflating the preform into a final shape of a hollow body, wherein each process valve unit of the plurality of blow-moulding stations has at least one valve,
and wherein each blow-moulding station of the plurality of blow-moulding stations is associated with at least one sensor,
wherein the method has at least the following steps:
detecting at least one first sensor value in each blow-moulding station, resulting in a plurality of detected first sensor values,
transmitting a plurality of first data values, which are associated with the plurality of at least one detected first sensor value of the plurality of blow-moulding stations, to the data processing unit, wherein each first data value of the plurality of first data value is associated with one of the plurality of blow-moulding stations, whereby the data processing unit receives the first data values of each blow-moulding station of the plurality of blow-moulding stations,
determining a first statistical average of the transmitted plurality of first data values, which are associated with the plurality of the detected first sensor values, in the data processing unit, thereby considering the first data values of all blow-moulding stations when determining the first statistical average,
defining the first statistical average, which is determined empirically, as a setpoint, and
using this empirically determined setpoint as an analytical tool for detecting problems in each blow-moulding station of the plurality of blow-moulding stations.

17. The method as claimed in claim 16, wherein the transmitted first data value is the detected first sensor value.

18. The method as claimed in claim 16, wherein the blow-moulding unit has a central controller, and wherein the first statistical average is stored in the central controller.

19. The method as claimed in claim 18, wherein the data processing unit is part of the central controller.

20. The method as claimed in claim 16, wherein the data processing unit is formed by a plurality of decentralized data processing units and these are part of decentralized control units.

21. The method as claimed in claim 20, wherein the first statistical average is stored in the decentralized control units.

22. The method as claimed in claim 21, wherein the transmitted second data value is the detected second sensor value and wherein the transmitted second data value is the difference between the detected second sensor value and the stored setpoint.

23. The method as claimed in claim 16, wherein the method has at least the following further steps:
determining whether individual transmitted first sensor values have a predetermined deviation from the first statistical average, and,
if an individual first sensor value has such a deviation, identification of the blow-moulding station associated with the sensor value.

24. The method as claimed in claim 16, wherein the method has at least the following further steps:
detecting at least one second sensor value in each blow-moulding station in a second blowing process,
transmitting the at least one detected second sensor value of each blow-moulding station to the data processing unit,
determining a second statistical average of the transmitted second sensor values in the data processing unit.

25. The method as claimed in claim 24, wherein the method has at least the following further steps:
determining whether individual transmitted second sensor values have a predetermined deviation from the first statistical average, or determining whether individual transmitted second sensor values have a predetermined deviation from the second statistical average, and,
if an individual second sensor value has such a deviation, identification of the blow-moulding station associated with the sensor value.

26. The method as claimed in claim 25, wherein, after the second statistical average has been determined, individual second sensor values which deviate from the second statistical average or alternatively from the first statistical average are first of all determined, and then a new second statistical average is formed with the remaining second sensor values, and, in the event of a deviation of this new second statistical average from the first statistical average, this new second statistical average is defined as a setpoint for the blow-moulding stations.

27. The method as claimed in claim 24, wherein the transmitted second data value is the detected second sensor value.

28. The method as claimed in claim 27, wherein the transmitted first data value is the difference between the detected first sensor value and the stored setpoint.

29. The method of claim 24, wherein, in case of deviation of the second statistical average from the first statistical average, the method comprises the step of defining the second statistical average as a setpoint.

30. The method as claimed claim 16, wherein the at least one sensor measures at least one of the following parameters: pressure in the hollow body to be produced, pressure in a fluid tank, current of a pilot valve, position or movement of the piston of a process valve.

31. The method as claimed in claim 16, wherein outliers from the norm can be detected.

32. The method as claimed in claim 16, wherein the statistical average is determined empirically.

* * * * *